United States Patent
Jungwirth

(10) Patent No.: US 10,175,344 B2
(45) Date of Patent: Jan. 8, 2019

(54) LIGHT DETECTION AND RANGING (LIDAR) SCANNING SYSTEMS AND METHODS

(71) Applicant: THE BOEING COMPANY, Chicago, IL (US)

(72) Inventor: Douglas R. Jungwirth, Porter Ranch, CA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 14/962,837

(22) Filed: Dec. 8, 2015

(65) Prior Publication Data

US 2017/0160382 A1    Jun. 8, 2017

(51) Int. Cl.
| | |
|---|---|
| *G01S 17/10* | (2006.01) |
| *G01S 17/42* | (2006.01) |
| *G02B 26/10* | (2006.01) |
| *G01S 7/481* | (2006.01) |
| *G01S 7/484* | (2006.01) |
| *G01S 17/89* | (2006.01) |

(52) U.S. Cl.
CPC ............ *G01S 7/4817* (2013.01); *G01S 7/484* (2013.01); *G01S 17/10* (2013.01); *G01S 17/42* (2013.01); *G01S 17/89* (2013.01); *G02B 26/101* (2013.01)

(58) Field of Classification Search
CPC ........ G01S 7/4817; G01S 7/484; G01S 17/89; G01S 17/10; G01S 17/42; G02B 26/101
See application file for complete search history.

(56) References Cited

U.S. PATENT DOCUMENTS

| | | | | |
|---|---|---|---|---|
| 4,627,734 A | * | 12/1986 | Rioux | G01B 11/24 356/3.04 |
| 4,717,224 A | * | 1/1988 | Diehl | G02B 26/0816 359/220.1 |
| 7,248,342 B1 | * | 7/2007 | Degnan | G01C 3/08 342/120 |
| 2005/0088512 A1 | * | 4/2005 | Nomura | B41J 2/471 347/260 |
| 2006/0082852 A1 | * | 4/2006 | Wine | G02B 26/085 359/201.1 |
| 2008/0100899 A1 | * | 5/2008 | Shimokawa | B81B 3/004 359/225.1 |
| 2009/0001847 A1 | * | 1/2009 | Tsuboi | B81B 3/0078 310/309 |
| 2015/0168713 A1 | | 6/2015 | Nowatzyk | |

OTHER PUBLICATIONS

Partial European Search Report for EP 16193045.6-1812, dated May 15, 2017.
Extended European Search Report for EP 16193045.6-1812, dated Aug. 16, 2017.

* cited by examiner

*Primary Examiner* — Eric L Bolda
(74) *Attorney, Agent, or Firm* — Joseph M. Butscher; The Small Patent Law Group, LLC

(57) ABSTRACT

A scanning system and method scan an area of interest. The scanning system may include a first scanner that deflects a light signal. The light signal that is deflected by the first scanner is output as an initially-deflected light signal. A second scanner receives the initially-deflected light signal and deflects the initially-deflected light signal. The initially-deflected signal that is deflected by the second scanner is output as a subsequently-deflected light signal.

19 Claims, 3 Drawing Sheets

LIGHT DETECTION AND RANGING (LIDAR) SCANNING SYSTEMS AND METHODS

FIELD OF THE DISCLOSURE

Embodiments of the present disclosure generally relate to systems and methods of scanning an area of interest with light signals, and, more particularly, to Light Detection and Ranging (LIDAR) scanning systems and methods.

BACKGROUND OF THE DISCLOSURE

LIDAR represents a sensing method that may be used to detect surface features of a target, such as various areas on the surface of the Earth. A typical LIDAR system includes a laser, a scanner, and a detector. The laser emits light pulses that are used to measure distances with respect to various areas of a particular target. The scanner moves the light pulses over the surface of the target. The light pulses reflect off the target and are received by the detector. The reflected light pulses received at the detector are used to generate three-dimensional information about the surface shape and area of the target.

A typical LIDAR system includes a single scanner that moves emitted light pulses over an area of interest that includes a target. A time of flight of each reflected light pulse is determined, as well as angles at which the light pulses were scanned. The combination of the time of flight and the scan angles are used to generate a three-dimensional image of the area of interest.

In general, the scanner includes a single beam steering element and optical elements. The LIDAR system receives reflected laser light pulses at the detector before emitting a subsequent laser light pulse. Further, the scanner typically includes a large mirror that is used to scan and reflect the light pulses. However, it is often difficult to achieve a fast scan rate with a scanner having a large mirror. Conversely, if a smaller mirror is used, while the scan rate increases, less return light is collected at a detector, as the smaller mirror may be too small to receive certain light pulses reflected from a target at particular angles.

SUMMARY OF THE DISCLOSURE

A need exists for a more efficient LIDAR scanning system and method. A need exists for a faster LIDAR scanning system and method that accurately generates images of an object within an area of interest.

With those needs in mind, certain embodiments of the present disclosure provide a scanning system that configured to scan an area of interest. The scanning system may include a first scanner that is configured to deflect a light signal. The light signal that is deflected by the first scanner is output as an initially-deflected light signal. A second scanner is configured to receive the initially-deflected light signal and deflect the initially-deflected light signal. The initially-deflected signal that is deflected by the second scanner is output as a subsequently-deflected light signal.

The first scanner and the second scanner cooperate to move the subsequently-deflected light signal over a combined scan path. The first scanner may be configured to deflect the light signal at a first rate, and the second scanner may be configured to deflect the initially-deflected light signal at a second rate that differs from the first rate. The first rate may be faster than the second rate. The first scanner may be configured to deflect the light signal at a first scan angle, and the second scanner may be configured to deflect the initially-deflected light signal at a second scan angle that differs from the first scan angle. The second scan angle may be greater than the first scan angle.

The first scanner may be a one-dimensional scanner. The second scanner may be a two-dimensional scanner. The first scanner may be an acousto-optic scanner, an electro-optic scanner, a piezo electric scanner, or a high speed mechanical scanner. The second scanner may include a mirror that is configured to be actuated with respect to two different axes.

The scanning system may also include a light source that is configured to emit the light signal into the first scanner. A detector may be configured to receive reflected light signals from an object within the area of interest. At least one lens may be configured to focus the reflected light signals into the detector. A deflection mirror may be disposed between the first and second scanners. The deflection mirror may include an aperture through which the initially-deflected light signal passes.

Certain embodiments of the present disclosure provide a scanning method that is configured to scan an area of interest. The scanning method may include receiving a light signal at a first scanner, initially deflecting the light signal with the first scanner, outputting the light signal that is deflected by the first scanner as an initially-deflected light signal, receiving the initially-deflected light signal at a second scanner, deflecting the initially-deflected light signal with the second scanner, and outputting the initially-deflected light signal that is deflected by the second scanner as a subsequently-deflected light signal. The method may include moving the subsequently-deflected light signal over a combined scan path.

Certain embodiments of the present disclosure provide a LIDAR scanning system configured to scan an area of interest. The LIDAR scanning system may include a light source that is configured to emit a light signal. A first scanner is configured to receive the light signal from the light source and deflect a light signal over a first scan angle at a first rate. The light signal that is deflected by the first scanner is output as an initially-deflected light signal. A second scanner is configured to receive the initially-deflected light signal and deflect the initially-deflected light signal over a second scan angle that is greater than the first scan angle at a second rate that is slower than the first rate. The initially-deflected signal that is deflected by the second scanner is output as a subsequently-deflected light signal. The second scanner may include a mirror that is configured to be actuated with respect to two different axes. The first scanner and the second scanner cooperate to move the subsequently-deflected light signal over a combined scan path. A deflection mirror may be disposed between the first and second scanners. The deflection mirror may include an aperture through which the initially-deflected light signal passes. At least one lens may be configured to focus reflected light signals from an object within the area of interest that are deflected into the lens(es) by the deflection mirror. A detector may be configured to receive the reflected light signals focused by the lens(es). A control unit may be configured to form one or more images based on the reflected light signals received by the detector.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide LIDAR scanning systems and methods that may include two separate and distinct scanners. One of the scanners may provide a relatively large scan angle at a first scan speed. The other scanner may provide a smaller scan angle at a second scan speed that is faster than the first scan speed. Light pulses from a light source (such as a laser light source) pass through both scanners and are diverted at particular speeds and angles. As the light pulses are reflected off a target within an area of interest, the reflected light pulses may impinge upon the first scanner and reflect to a detector.

Certain embodiments of the present disclosure provide a duel stage scanning system that combines two scanners to achieve an enhanced scan pattern, while maintaining large return signal collection efficiencies. In at least one embodiment, a duel stage scanning system may include a laser source, a high speed scanner, a low speed scanner, a pick off mirror that may include an aperture to allow the passage of a light signal (for example, a laser beam or pulse) through the high speed scanner, a detector, and a focusing lens that may be used to direct a plurality of beams from a target into the detector.

Figures 1, 2:
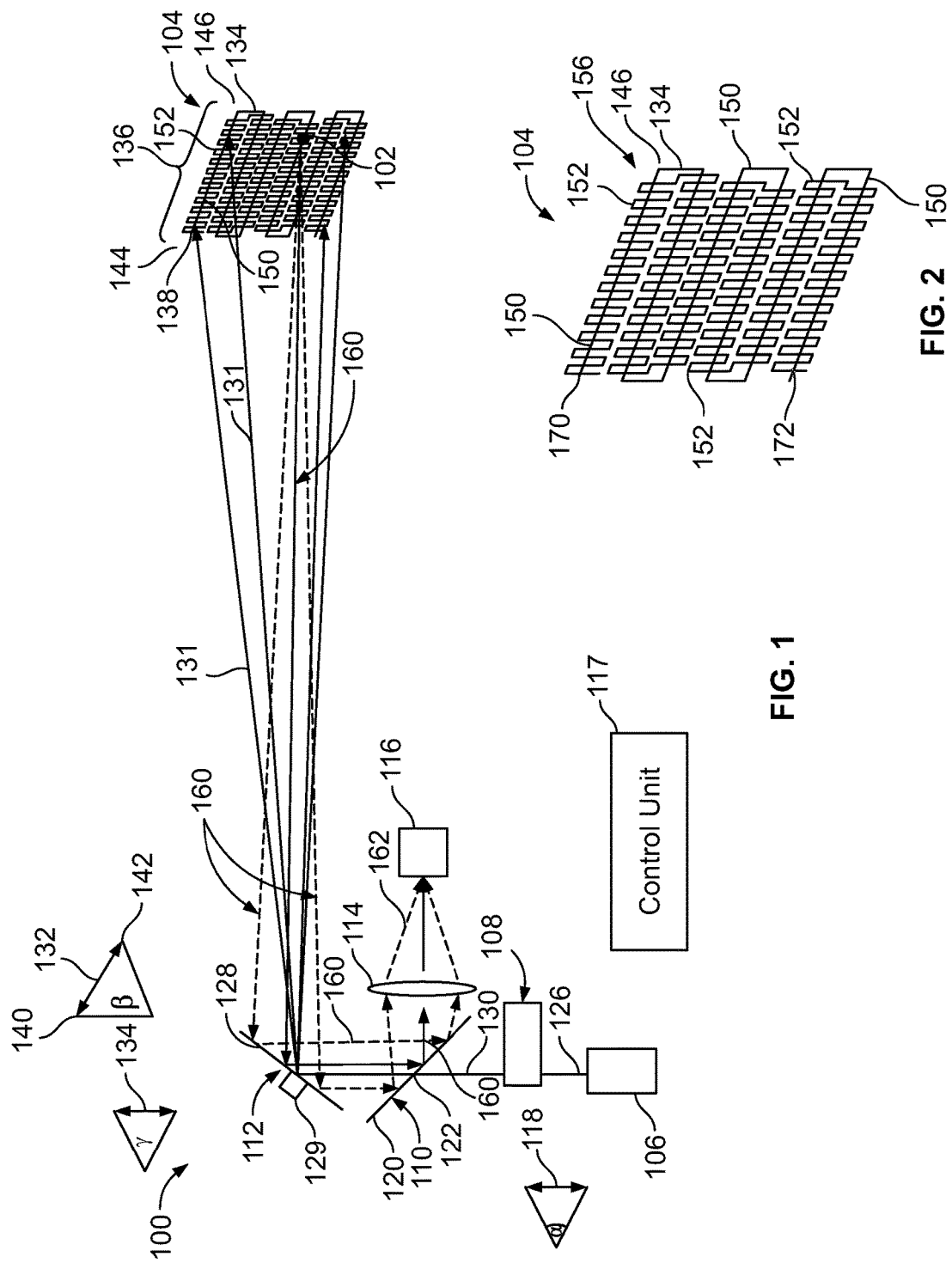
FIG. 1 illustrates a schematic diagram of a scanning system, according to an embodiment of the present disclosure.
FIG. 2 illustrates a perspective view of first and second scan paths within an area of interest, according to an embodiment of the present disclosure.

FIG. 1 illustrates a schematic diagram of a scanning system 100, according to an embodiment of the present disclosure. The scanning system 100 may be a LIDAR scanning system that is used to generate a three-dimensional image of a target 102 within an area of interest 104. The target 102 may be a natural or manmade structure. For example, the target 102 may be a feature of a landscape, such as a plain, a hill, a mountain, a body of water, a natural landmark or formation, or the like. As another example, the target 102 may be a manmade object, such as a building, vehicle, road, portion of a railway, monument, and/or the like.

The scanning system 100 may include a light source 106, a first scanner 108, a deflection mirror 110, a second scanner 112, a lens 114, and a detector 116. A control unit 117 may be operatively coupled to the light source 106, the first scanner 108, the second scanner 112, and the detector 116, such as through wired or wireless connections. The control unit 117 may be configured to control operation of the scanning system 100. Optionally, the scanning system 100 may not include the separate and distinct control unit 117.

In general, the first scanner 108 is configured to receive a light signal 126 emitted or otherwise output by the light source 106 and deflect the light signal 126 to form an initially-deflected light signal 130. The second scanner 112 receives the initially-deflected light signal 130 and deflects (for example, steers) the initially-deflected light signal 130, thereby outputting a subsequently-deflected light signal 131, which may be scanned over an area of interest.

The light source 106 may be a laser source that is configured to emit or otherwise output the light signal 126, such as one or more laser light pulses, beams, or the like. The first scanner 108 may be a high speed scanner that is configured to deflect the light signal 126 over a scan angle or angular range in one dimension or one degree of freedom. For example, the first scanner 108 may be configured to deflect the light signal 126 over a first scan angle or angular range $\alpha$ in one linear direction 118 at a first rate to form the initially-deflected light signal 130. The first scanner 108 may scan at a high rate or frequency, such as 1-10 MHz. Alternatively, the first scanner 108 may scan at a lower rate or frequency than 1 MHz, or a higher rate or frequency than 10 MHz.

For example, the first scanner 108 may be a high speed scanner, such as acousto-optic scanner, an electro-optic scanner, a piezo electric scanner, a high speed mechanical scanner, and/or the like. For example, an acousto-optic scanner may use Bragg scattering to deflect a beam at an angle that is proportional to an acoustic wave. The first scanner 108 may be configured to perform high speed, precise, low travel range scans. In general, as the scan rate increases, the scan angle may decrease, and vice versa.

As another example, the first scanner 108 may be a high speed scanner, such as an electro-optic scanner. Certain optical quality crystals have an index of refraction that changes depending on a magnitude of an electric field applied thereto. An optical element having a wedge formed of such a crystal may be used as a high speed deflector when a particular voltage is applied.

The deflection mirror 110 may be disposed between the first scanner 108 and the second scanner 112. The deflection mirror 110 may include a main reflecting body 120 having an aperture 122 formed therethrough. The aperture 122 is sized and shaped to allow the initially-deflected light signal 130 to pass therethrough and impinge upon the second scanner 112. The aperture 122 is sized and shaped to accommodate the scan angle $\alpha$.

The second scanner 112 may be a low speed scanner (in relation to the first scanner 108) and include a mirror 128 (such as a 2-axis mirror—that is, a mirror that may be actuated with respect to two different axes) operatively coupled to one or more actuators 130. The second scanner 112 may scan at a lower rate than the first scanner. For example, the second scanner 112 may scan at a rate or frequency of 1-10 kHz. Alternatively, the second scanner 112 may scan at a rate or frequency of less than 1 kHz, or greater than 10 kHz. The second scanner 112 scans at a rate that may be one or more orders of magnitude less than the first scanner 108. For example, the first scanner 108 may scan at a rate than is 100 times the rate at which the second scanner 112 scans.

The second scanner 112 may provide a large field of view (in comparison to the first scanner 108) that is configured to allow for full target scan areas. The actuator 129 is configured to steer the light signal deflected by the first scanner 108 (the initially-deflected light signal 130) in two dimensions or two degrees of freedom. The first scanner 108 deflects the initially-deflected light signal 130 over the a scan angle β, thereby outputting a subsequently-deflected light signal 131.

For example, the actuator 129 moves the mirror 128 over a scan angle or angular range β through a distance 132, as well as a scan angle or angular range γ through a distance 134. The angular range γ may be greater than the angular range α. The angular range β may be large enough to cover a lateral distance 136 of the area of interest 104. In at least one embodiment, the angular range γ may be at least twice the angular range α. Accordingly, as the second scanner 112 steers the subsequently-deflected light signal 131 in a first lateral sweep from left to right, the subsequently-deflected light signal 131 covers a half portion over a center 138, and another half portion under center 138, thereby providing a thicker or wider scan area as the second seamier 112 sweeps the subsequently-deflected light signal 131 from side-to-side. After the second scanner 112 reaches a right end of the distance 132 (corresponding to the right end of the lateral distance 136), the second scanner 112 steers or otherwise deflects the subsequently-deflected light signal 131 downwardly a distance 134. Then, the second scanner 112 steers or otherwise deflects the subsequently-deflected light signal 131 from right to left over the distance 132. During such movement, a top portion of the subsequently-deflected light signal 131 reaches the lower level at which the subsequently-deflected light signal 131 was scanned in the previous left to right sweep. In this manner, the first scanner 108 may continually deflect the light signal 126 at a relatively fast rate over the distance 118, while the second scanner 112 slowly steers or otherwise the deflected light signal 131 over the distance 132, which may be orthogonal to the distance 118. In at least one embodiment, the first scanner 108 may deflect the light signal 126 over the distance 118 at a rate that is 50, 100, or more times the rate at which the second scanner 112 steers or otherwise deflects the subsequently-deflected light signal 131 over the distance 132. After the second scanner 112 reaches a terminal distance 140 or 142 (which correspond to terminal sides 144 and 146, respectively, of the area of interest 104), the second scanner 112 adjusts the subsequently-deflected light signal 131 in the orthogonal direction 134 to cover a different level or height of the area of interest 104.

In operation, the light source 106 emits the light signal 126 towards the first scanner 108. For example, the control unit 117 may operate the light source 106 to emit the light signal 126 towards the first scanner 108.

The light signal 126 passes through the first scanner 108, which deflects the light signal 126 the distance 118 over the angular range α to output the initially-deflected light signal 130. As such, the first scanner 108 outputs the initially-deflected light signal 130 that is wider than the light signal 126.

The initially-deflected light signal 130 passes through the aperture 122 of the deflection mirror 110 and impinges upon the mirror 128 of the second scanner 112. Alternatively, the scanning system 100 may not include the deflection mirror 110. Instead, the detector 116 may be aligned such that light signals reflected from the object 102 impinge on the mirror 128 and are received by the detector 116 without the use of the deflection mirror 110.

The second scanner 112 steers or otherwise deflects the deflected light signal 130 over the distance 132, as noted above, to form the subsequently-deflected light signal 131. The second scanner 112 steers the subsequently-deflected light signal 131 over a first scan path 150 that alternates from left to right, and up and down, as shown in FIG. 1. As the subsequently-deflected light signal 131 is steered over the first scan path, the first scanner 108 continually deflects the light signal 126 (thereby forming the initially-deflected signal 130), which forms a second scan path 152 superimposed over the first scan path 150. The second scan path 152 is formed by the continuous deflection of the deflected light signal 130 in a direction that is orthogonal to a direction of the distance 132. For example, as the second scanner 112 steers the subsequently-deflected light signal 131 in lateral directions (for example, from right to left, and vice versa), the first scanner 108 continually deflects the light signal 126 in vertical directions (for example, from bottom to top, and vice versa). As such, the first and second light paths 150 and 152 provide a combined light path that covers an increased area (as compared to using only a single scanner) within the area of interest 104 with each lateral sweep. In this manner, the first and second scanners 108 and 112 are able to efficiently cover the area of interest 104 much quicker than a single scanner. At the same time, the first and second mirrors 108 and 112 are not susceptible to missing reflected light signals (such as a high speed scanner having a small mirror), as the large mirror 128 of the second scanner 112 receives the reflected signals from the object 102.

The first and second scanners 108 and 112 cooperate to scan the deflected light signal 130 over the area of interest 104. The object 102 reflects reflected light signals 160 that are reflected back to the mirror 128. The reflected light signals 160 reflect off the mirror 128 and impinge upon the deflection mirror 110, which then deflects the reflected light signals 160 into the detector 116. The lens 114 may focus the reflected light signals 160 into focused light signals 162 that are received by the detector 116. Alternatively, the scanning system 100 may not include the lens 114. Instead, the reflected light signals 160 may directly impinge upon the detector 116 without being focused by a lens.

The control unit 117 may determine features of the object 102 based on the light signals received at the detector 116, as well as the time of flight and scan angles of the light signals emitted from the light source 106. Further, the control unit 117 may control operation of the first and second scanners 108 and 112. For example, the control unit 117 may control the rate and distance at which the first and second scanners 108 and 112 deflect and/or steer the light signal. In at least one embodiment, the control unit 117 may not control operation of the first and second scanners 108 and 112. In such an embodiment, the first and scanners 108 and 112 may automatically operate to deflect and/or steer the light signal based on settings that are pre-set in internal control units.

As described above, the control unit 117 may be used to control operation of the scanning system 100. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 117 may be or include one or more processors that are configured to control operation of the scanning system 100.

The control unit 117 is configured to execute a set of instructions that are stored in one or more storage elements (such as one or more memories), in order to process data. For example, the control unit 117 may include or be coupled to one or more memories. The storage elements may also store data or other information as desired or needed. The storage elements may be in the form of an information source or a physical memory element within a processing machine.

The set of instructions may include various commands that instruct the control unit 117 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 117. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 117 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

FIG. 2 illustrates a perspective view of the first and second scan paths 150 and 152 within the area of interest 104, according to an embodiment of the present disclosure. The first and second scan paths 150 and 152 combine to form a combined scan path 156 that quickly and efficiently covers the area of interest 104. Referring to FIGS. 1 and 2, the second scanner 112 steers the subsequently-deflected light signal 131 over the first scan path 150 that alternates from left to right, and up and down, as shown in FIG. 2. For example, the first scan path 150 may start at an origin 170 at a left terminal side 144 and move from left to right to the right terminal side 146. The first scan path 150 then moves downwardly the distance 134, and then moves from right to left to the left terminal side 144. The first scan path 150 continues such movement, alternating between rightward and leftward movement, until an end 172 is reached. The end 172 may be determined on a desired size and shape of the area of interest 104. The area of interest 104 may be larger or smaller than shown. The first scan path 150 may be larger or smaller than shown. For example, the first scan path 150 may include more or less than six lateral sweeps.

As the second scanner 112 steers the subsequently-deflected light signal 131 over the first scan path 150, the first scanner 108 continually and alternately deflects the light signal 126 over the distance 118 to impart a vertical modulation to the subsequently-deflected light signal. The first scanner 108 may deflect the light signal 126 in a direction that is orthogonal to the lateral direction of the sweep imparted by the second scanner 112. That is, the first scanner 108 may deflect the light signal 126 in a direction that is orthogonal to the direction of lateral steering of the second scanner 112. Accordingly, as the second scanner 112 steers the subsequently-deflected light signal 131 over the first scan path 150, the first scanner 108 wiggles, pivots, or otherwise modulates the light signal 126 to form the deflected light signal 130, which exhibits the second scan path 152 as the second scanner 112 moves the subsequently-deflected light signal 131 over the first scan path 150. In this manner, the second scanner 112, which may be a low speed scanner, sweeps the subsequently-deflected light signal 131 over the first scan path 150, and the second scan path 152 provides wide coverage for each lateral sweep (substantially wider than if only the second scanner 112 were used).

It is to be understood that the first and second scan paths 150 and 152 are not separate and distinct light paths. Instead, the first and second scan paths 150 and 152 represent the movement imparted into the light signal 126 by both the first and second scanners 108 and 112. That is, the first and second scanners 108 and 112 cooperate to deflect the light signal 126 at different rates and directions to cover the area of interest 104 in an efficient manner.

The second scan path 152 is formed by the continuous deflection of the initially-deflected light signal 130 in a direction that is orthogonal to a direction of the distance 132. For example, as the second scanner 112 steers the deflected light signal 130 in lateral directions (for example, from right to left, and vice versa), the first scanner 108 continually deflects the light signal 126 in vertical directions (for example, from bottom to top, and vice versa). In this manner, the first and second scanners 108 and 112 are able to efficiently cover the area of interest 104 much quicker than a single scanner having a large mirror. At the same time, the first and second scanners 108 and 112 are not susceptible to missing reflected light signals (such as a high speed scanner having a small mirror), as the large mirror 128 of the second scanner 112 receives the reflected signals from the object 102.

The initially-deflected light signal 130, as output by the first scanner 108, deflects off the mirror 128 of the second scanner 112, thereby outputting the subsequently-deflected light signal 131, which provides a much larger outgoing scan range than if just the second scanner 112 were used. The deflection range and rate of the first scanner 108 may correct for scanning inaccuracies that may otherwise by generated by the second scanner 112 (which may be a low speed scanner) due to the relatively large size and inertia of the mirror 128.

Figure 3:
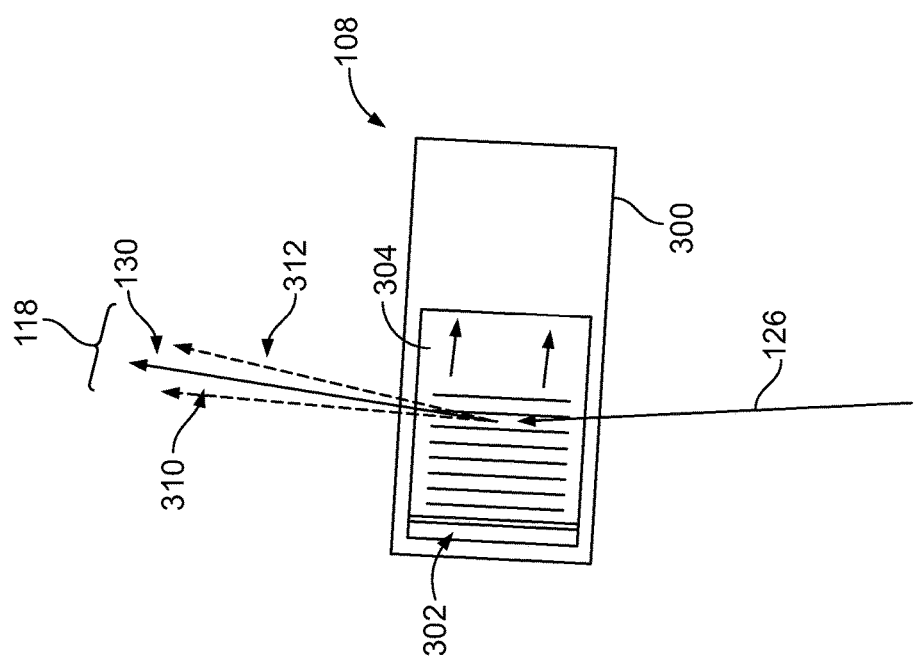
FIG. 3 illustrates a schematic view of a first scanner, according to an embodiment of the present disclosure.

FIG. 3 illustrates a schematic view of the first scanner 108, according to an embodiment of the present disclosure. As noted, the first scanner 108 may be a high speed scanner, such as an acousto-optic scanner. The first scanner 108 may include a housing 300 containing a piezo electric crystal 302. The piezo electric crystal generates acoustic waves 304. As the light signal 126 passes through the piezo electric crystal 302, the light signal 126 is scattered in relation to the acoustic waves 304. The scatted light signal 126 forms the deflected signal 130, which includes a portion 310 that scatters in relation to a lower acoustic frequency, and a portion 312 scattered in relation to a higher acoustic frequency. The deflected light signal 130 scatters off the acoustic waves 304 at an angle proportional to the frequencies of the acoustic waves 304.

Figure 4:
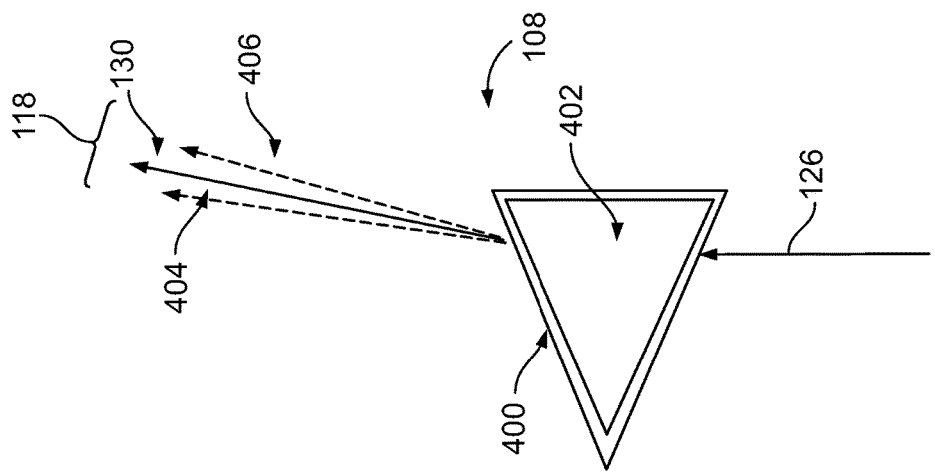
FIG. 4 illustrates a schematic view of a first scanner, according to an embodiment of the present disclosure.

FIG. 4 illustrates a schematic view of the first scanner 108, according to an embodiment of the present disclosure. In this embodiment, the first scanner 108 may be an electro-optic scanner including an electro-optic crystal 400 shaped as a wedge. Voltage pads 402 may be applied to a top and bottom of the crystal 400. When a voltage is applied to the voltage pads, the refractive index of the crystal 400 changes, which thereby refracts the light in a different direction. The deflected light signal 130 may include a portion 404 that refracts due to a lower applied voltage, and a portion 406 that refracts due to a higher applied voltage. The deflected light signal 130 refracts at an angle proportional to the applied voltage and the shape of the crystal 400.

Figure 5:
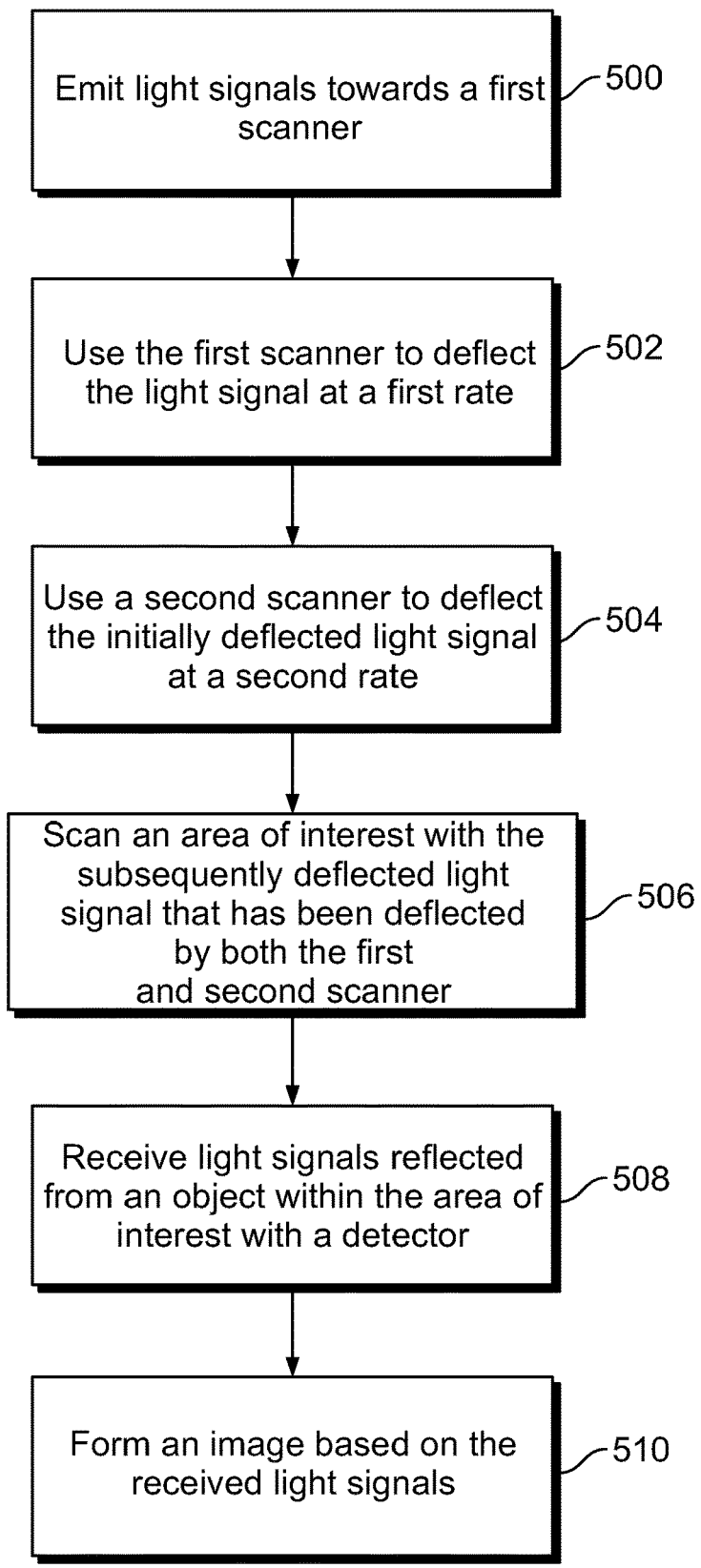
FIG. 5 illustrates a flow chart of a method of scanning an area of interest, according to an embodiment of the present disclosure.

FIGS. 3 and 4 illustrate examples of high speed scanners. Various other types of high speed scanners may be used. For example, the first scanner 108 may be or include a piezo electric scanner, a high speed mechanical scanner, or the like FIG. 5 illustrates a flow chart of a method of scanning an area of interest, according to an embodiment of the present disclosure. The control unit 117 may operate the scanning system 100 according to the method described and shown with respect to FIG. 5.

The method begins at 500, in which light signals are emitted towards a first scanner. For example, a laser source may emit pulsed lasers into and through the first scanner, which may be a high speed scanner.

At 502, the first scanner is used to deflect the light signal at a first rate, thereby outputting an initially-deflected light signal. The first scanner may deflect the light signal in relation to a first linear dimension (for example, parallel to an X or Y axis).

At 504, a second scanner, such as a low speed scanner, is used to deflect the initially-deflected light signal (as first deflected by the first scanner) at a second rate, which differs from the first rate. The second scanner may deflect the initially-deflected light signal in relation to two dimensions (for example, in a first direction that is parallel to a Y or Z axis, and also in a second direction that is parallel to an X axis). A subsequently-deflected light signal is output by the second scanner.

At 506, an area of interest is scanned with the subsequently-deflected light signal that has been deflected by both the first and second scanners. The first and second scanners cooperate to move the subsequently-deflected light signal over the area of interest through a path that is a combination of a first scan path (defined by the motion of the light signal as imparted by the first scanner) and a second path (defined by the motion of the light signal as imparted by the second scanner). It is to be understood that the terms "first" and "second," are merely used to designate distinct paths. A first path is not necessarily correlated with a first scanner, nor is a second path necessarily correlated with a second scanner. Instead, the first scanner may move the light signal in relation to a second scan path, while the second scanner may move the light signal in relation to a first scan path, or vice versa.

At 508, light signals reflected from an object within an area of interest are received by a detector. The light signals may be focused into the detector through one or more lenses. At 510, an image is formed based on the received light signal.

As described above, embodiments of the present disclosure provide efficient scanning systems and methods, such as may be used with LIDAR. Embodiments of the present disclosure provide faster scanning systems and methods that accurately generate images of an object within an area of interest.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A scanning system configured to scan an area of interest, wherein the scanning system comprises:
   a first scanner configured to deflect a light signal, wherein the light signal that is deflected by the first scanner is output as an initially-deflected light signal;
   a second scanner configured to receive the initially-deflected light signal and deflect the initially-deflected light signal, wherein the initially-deflected signal that is deflected by the second scanner is output as a subsequently-deflected light signal; and
   a deflection mirror disposed between the first and second scanners, wherein the deflection mirror comprises an aperture through which the initially-deflected light signal passes.

2. The scanning system of claim 1, wherein the first scanner and the second scanner cooperate to move the subsequently-deflected light signal over a combined scan path.

3. The scanning system of claim 1, wherein the first scanner is configured to deflect the light signal at a first rate, and wherein the second scanner is configured to deflect the initially-deflected light signal at a second rate that differs from the first rate.

4. The scanning system of claim 3, wherein the first rate is faster than the second rate.

5. The scanning system of claim 1, wherein the first scanner is configured to deflect the light signal at a first scan angle, and wherein the second scanner is configured to deflect the initially-deflected light signal at a second scan angle that differs from the first scan angle.

6. The scanning system of claim 5, wherein the second scan angle is greater than the first scan angle.

7. The scanning system of claim 1, wherein the first scanner is a one-dimensional scanner, and wherein the second scanner is a two-dimensional scanner.

8. The scanning system of claim 1, wherein the first scanner is one of an acousto-optic scanner, an electro-optic scanner, a piezo electric scanner, or a high speed mechanical scanner.

9. The scanning system of claim 1, wherein the second scanner comprises a mirror configured to be actuated with respect to two different axes.

10. The scanning system of claim 1, further comprising a light source configured to emit the light signal into the first scanner.

11. The scanning system of claim 1, further comprising a detector configured to receive reflected light signals from an object within the area of interest.

12. The scanning system of claim 11, further comprising at least one lens configured to focus the reflected light signals into the detector.

13. A scanning method that is configured to scan an area of interest, wherein the scanning method comprises:
   receiving a light signal at a first scanner;
   initially deflecting the light signal with the first scanner;
   outputting the light signal that is deflected by the first scanner as an initially-deflected light signal;
   passing the initially-deflected light signal through an aperture of a deflection mirror that is disposed between the first scanner and a second scanner;
   receiving the initially-deflected light signal at the second scanner;
   deflecting the initially-deflected light signal with the second scanner; and
   outputting the initially-deflected light signal that is deflected by the second scanner as a subsequently-deflected light signal.

14. The scanning method of claim 13, further comprising moving the subsequently-deflected light signal over a combined scan path.

15. The scanning method of claim 13, wherein the initially deflecting the light signal comprises initially deflecting the light signal at a first rate, and wherein the deflecting the initially-deflected light signal comprises deflecting the initially-deflected light signal at a second rate that differs from the first rate.

16. The scanning method of claim 15, wherein the first rate is faster than the second rate.

17. The scanning method of claim 13, wherein the initially deflecting the light signal comprises initially deflecting the light signal at a first scan angle, and wherein the deflecting the initially-deflected light signal comprises deflecting the initially-deflected light signal at a second scan angle that differs from the first scan angle.

18. The scanning method of claim 17, wherein the second scan angle is greater than the first scan angle.

19. A Light Detection and Ranging (LIDAR) scanning system configured to scan an area of interest, wherein the LIDAR scanning system comprises:
   a light source configured to emit a light signal;
   a first scanner configured to receive the light signal from the light source and deflect a light signal over a first scan angle at a first rate, wherein the light signal that is deflected by the first scanner is output as an initially-deflected light signal;
   a second scanner configured to receive the initially-deflected light signal and deflect the initially-deflected light signal over a second scan angle that is greater than the first scan angle at a second rate that is slower than the first rate, wherein the initially-deflected signal that is deflected by the second scanner is output as a subsequently-deflected light signal, wherein the second scanner comprises a mirror that is configured to be actuated with respect to two different axes, wherein the first scanner and the second scanner cooperate to move the subsequently-deflected light signal over a combined scan path;
   a deflection mirror disposed between the first and second scanners, wherein the deflection mirror comprises an aperture through which the initially-deflected light signal passes;
   at least one lens configured to focus reflected light signals from an object within the area of interest that are deflected into the at least one lens by the deflection mirror;
   a detector configured to receive the reflected light signals focused by the at least one lens; and
   a control unit configured to form one or more images based on the reflected light signals received by the detector.

* * * * *